United States Patent [19]

Van Gestel

[11] 4,414,585
[45] Nov. 8, 1983

[54] METHOD OF TRANSMITTING AN AUDIO SIGNAL VIA A TRANSMISSION CHANNEL

[75] Inventor: Wilhelmus J. Van Gestel, Eindhoven, Netherlands

[73] Assignee: U.S. Philips Corporation, New York, N.Y.

[21] Appl. No.: 313,446

[22] Filed: Oct. 21, 1981

[30] Foreign Application Priority Data

May 8, 1981 [NL] Netherlands .......................... 8102251

[51] Int. Cl.³ ............................................... G11B 5/09
[52] U.S. Cl. ........................................ 360/40; 360/48
[58] Field of Search ......................... 360/32, 40, 41, 48

[56] References Cited

U.S. PATENT DOCUMENTS 4,041,453  8/1977  Umeda et al. .......................... 360/39
4,143,406  3/1979  Tsuiki et al. .......................... 360/48
4,277,807  7/1981  Baldwin ............................... 360/48

Primary Examiner—Vincent P. Canney
Attorney, Agent, or Firm—Thomas A. Briody; William J. Streeter

[57] ABSTRACT

A method of converting an audio signal into a binary signal and vice versa. During conversion samples of the audio signal are converted into data words comprising a plurality of amplitude bits and one sign bit. Subsequently each data word is divided into a plurality of (N) subwords, each subword comprising one of the N most significant amplitude bits of the data word. The data words thus obtained are modulated in accordance with the NRZ-M modulation. The binary signal thus obtained excells in respect of bandwidth and the possibility of clock generation during demodulation.

8 Claims, 5 Drawing Figures

METHOD OF TRANSMITTING AN AUDIO SIGNAL VIA A TRANSMISSION CHANNEL

The invention relates to a method of converting an analog audio signal into a binary signal and vice versa. Specifically, the invention is intended for use in a transmission system for recording and reproducing an audio signal on a record carrier. The analog audio signal is converted into a binary signal by means of an analog-to-digital converter, which converts samples of the analog audio signal into digital data words of M data bits each. A modulator converts the data words into a binary signal. The modulation by the modulator is such that in the binary signal data bits of a first type are represented by the presence of a level transition and data bits of a second type by the absence of such a level transition. The binary signal is re-converted into the analog audio signal by means of a demodulator, by which the binary signal is demodulated and converted into digital data words of M data bits each. A digital-to-analog converter converts the data words into analog sample values of the audio signal.

BACKGROUND OF THE INVENTION

Especially in the field of recording and/or playback of audio signals on a record carrier, digital encoding techniques are now the focus of interest. This interest is aroused by endeavours to develop a recording/reproducing system which guarantees a very high quality of the audio signal. A system which is eminently suitable for this purpose employs a disk-shaped record carrier in which audio information is recorded in the form of an optically detectable relief structure, which can be read by means of a radiation beam focused at the record carrier. The signal recorded on the record carrier is then digitally coded, so that a very wide dynamic range and a very high signal-to-noise ratio can be obtained. Digital recording also commands great interest for magnetic recording purposes.

However, for an optimum use of the possibilities presented by digital coding techniques the digital coding system should meet a number of specific requirements.

The principal requirement is that the bandwidth of the digitally coded signal should be limited. When digitally coded signal is transmitted via a transmission channel the signal bandwidth should obviously be within the available bandwidth of the transmission channel. Of course, this is also valid when the digitally coded signal is recorded on a record carrier. Moreover, in the last-mentioned case the bandwidth of the digitally coded signal has direct consequences for the playing time attainable with the record carrier.

A second important requirement is that the coding system be self-clocking, in other words that a clock signal can be derived from the digitally coded signal, which clock signal is necessary for decoding the digital signal. However, this is possible only if it is guaranteed that the digital signal contains a signal transition at regular intervals, in other words if the distance between consecutive signal transitions is not too great.

SUMMARY OF THE INVENTION

It is an object of the invention to provide a transmission method which meets these requirements to a large extent. To this end, the transmission method according to the invention is characterized in that the analog-to-digital conversion is adapted to supply data words comprising $M-1$ amplitude bits, which together in binary coded form represent the sample magnitude, and one sign bit, which represents the polarity of the sample, said analog-to-digital conversion being such that a sample having zero value results in $M-1$ amplitude bits of the first type and that prior to the modulation each data work is divided into N subwords, the data bits of the data word being arranged in such a way in the subwords that each subword contains one of the N most significant amplitude bits of the data word, while during reconversion of the binary signal into the analog audio signal, upon demodulation of the binary signal, the data bits of the N subwords are always rearranged to form data words of M data bits and the digital-to-analog conversion is adapted to convert said data words comprising $M-1$ amplitude bits and one sign bit into an analog sample value.

Since the transmission method in accordance with the invention for the conversion of digital data words into a binary signal employs a modulation technique which only introduces a level transition into the transmission signal upon the occurrence of a data bit of the first type ("1"), which modulation technique is known by the designation NRZ-M (Non Return to Zero Mark), it is achieved that the transmission signal has a relatively small bandwidth. This is because said bandwidth is determined by the shortest distance between consecutive signal transitions in the transmission signal, which in the case of NRZ-M modulation is a one bit cell.

When using this modulation technique, however, the distance between consecutive level transitions in the transmission signal may become relatively large, which means that the transmission system has poor self-clocking properties. The method in accordance with the invention largely mitigates this drawback of NRZ-M modulation without affecting its advantages. For this purpose the invention effectively utilises the properties of an audio signal and comprises three steps:

1. During the analog-to-digital conversion data words of M data bits are formed, of which $(M-1)$ data bits represent the magnitude of the signal sample and one data bit the polarity of the sample. This ensures that in the data words these data bits which in the case of a strong audio signal constitute a logic "1" occupy a fixed predictable position, because said data bits constitute the most significant bits (MSB) of the $M-1$ amplitude bits.

2. During the analog-to-digital conversion the data bits are inverted, in other words a data bit which normally would be a logic "1" becomes a logic "0" and vice versa. Thus, a sample of zero amplitude is not converted into a data word of $(M-1)$ data bits with a logic "0", but into $(M-1)$ data bits with a logic "1". This step ensures that the most significant amplitude bits of a data word will be a logic "1" with a very high probability. Loud passages in an audio signal, in other words samples with a very high amplitude, occur only rarely, so that as a result of said inversion the most significant amplitude bits will have the logic value "1" in the vast majority of the data words. Since, via the NRZ-M modulation, said logic value "1" causes a level transition in the transmission signal, this means that it is fairly certain that the most significant amplitude bits produce the relevant level transitions in the binary signal.

3. Each data word is divided into N subwords and the $(M-1)$ data bits are distributed among said subwords in such a way that each subword comprises one of the N most significant amplitude bits. Thus, the probability is high that in each subword at least one of the data bits produces a level transition in the binary signal. This means that the distance between two consecutive level transitions is very likely to be always smaller than M/N data bits when the most significant amplitude bits have said mutual distance.

In this way it is achieved that without detracting from the advantages of the NRZ-M modulation the clock generation for the decoding has been improved considerably.

A preferred embodiment of the method in accordance with the invention is characterized in that the amplitude bits are arranged in the N subwords in such a way that each subword contains one of the N least significant amplitude bits (LSB) in consecutive subgroups is then amplitude bits. The spacing between said least significant preferably equal to M/N bit cells.

In those cases in which the distance between consecutive level transitions tends to become too great, this embodiment offers the possibility of a correction. For this purpose, in accordance with a further characteristic feature of the invention, an additional level transition may be generated, during modulation, at the location of the least significant amplitude bit of a subword if no level transition has occurred within a time window, which contains said least significant bit and which has a duration corresponding to M/N data bits after the standard modulation. Obviously, this introduction of an additional signal transition at the location of the least significant amplitude bit introduces an error in the audio signal. However, this situation occurs only if the most significant amplitude bit of the relevant data word is "0", that is during a loud passage of the audio signal. This means that the error introduced by modification of one of the least significant amplitude bits is hardly audible in the audio signal.

BRIEF DESCRIPTION OF THE DRAWINGS

The invention will now be described in more detail with reference to the drawings, in which.

DETAILED DESCRIPTION OF THE PREFERRED EMBODIMENTS

Figure 1:
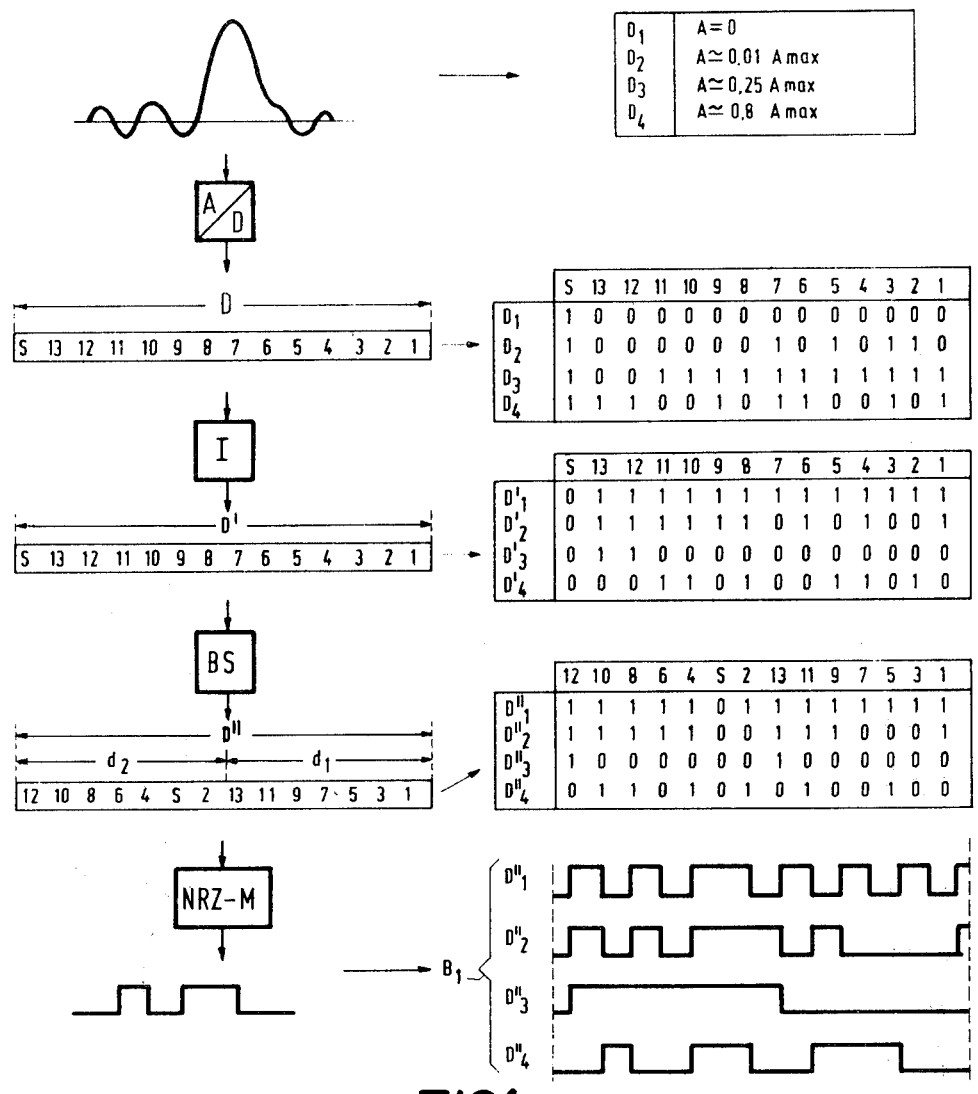
FIG. 1 schematically represents the method in accordance with the invention.

FIG. 1 schematically represents how by means of the method in accordance with the invention the analog audio signal is converted into a binary signal. The left-hand part of the Fig. schematically represents the steps which are carried out and the right-hand part of the Fig. represents the resulting signals for four signal values of the audio signal. As is shown in the top-right box in the Figure, the adopted signal values are $A=0$, $A=0.01$ $A_{max}$, $A=0.25$ $A_{max}$ and $A=0.8$ $A_{max}$, where $A_{max}$ is the maximum amplitude of the audio signal.

The analog audio signal is sampled in known manner, for example with a sampling frequency of 44 kHz, after which said samples are converted into data words D by means of an analog-to-digital converter A/D. In the present embodiment, it is assumed that the A/D-converter supplies data words D of 14 data bits, the data bits having the sequence numbers 1-13 (hereinafter referred to as amplitude bits) representing the magnitude of the sample, and the fourteenth data bit S (hereinafter referred to as sign bit) representing the polarity of the relevant sample.

The data words D supplied by the A/D converter are applied to an inverter I, which inverts the data bits ($0 \rightarrow 1$ and $1 \rightarrow 0$), resulting in data words D'. Subsequently, the data words D' are applied to a device BS, which changes the sequence of the data bits within each data word D'. Specifically, the data bits of each data word D' are arranged in a number of (N) subgroups in such a way that each subgroup contains one of the (N) most significant amplitude bits of the data word. In the present example it is assumed that each data word D' is converted into a data word D'' comprising two subgroups $d_1$ and $d_2$, so that $N=2$. Each of the subgroups, each comprising 7 data bits, comprises one of the two most significant amplitude bits. Thus, the subword $d_1$ contains the amplitude bit with the sequence number 13 and the subword $d_2$ the amplitude bit with the sequence number 12, while it can be seen that these two most significant amplitude bits 12 and 13 are positioned in such a way within the subgroups that their spacing is always 7 bit cells. Furthermore, the Figure shows that in the present example the data bits are arranged in such a way that the subgroup $d_1$ comprises the amplitude bits with odd sequence numbers (1, 3 . . . 13) and the subgroup $d_2$ the amplitude bits with even sequence numbers 2, 4 . . . 12) plus the sign bit (S).

Figure 2:
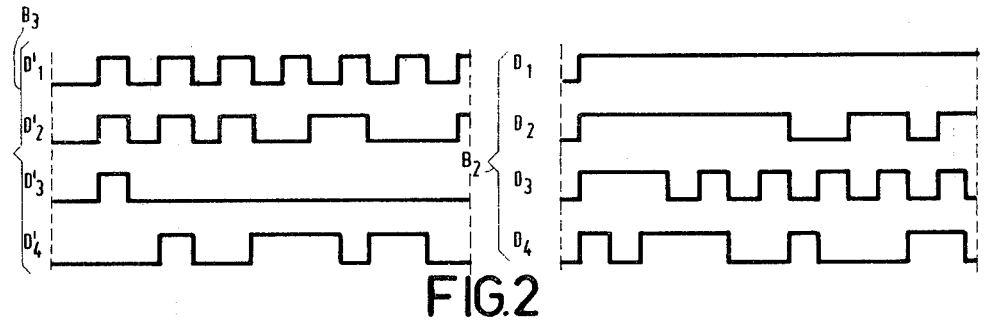
FIG. 2 shows signal waveforms to illustrate the advantages of the invention.

The data words D'' thus obtained are now applied to an NRZ-M modulator which supplies the desired binary signal. The NRZ-M modulator has the property that a data bit with logic value "1" in the binary signal is characterized by a level transition, while a data bit with a logic value "0" is characterized by the absence of such a level transition. For the sample values adopted this ultimately results in the binary signals designated $B_1$ Hereinafter the results achieved by means of the various steps will be explained in more detail. In order to illustrate these results FIG. 2 represents the binary signals designated $B_2$ which would have occurred if the data words ($D_1$ . . . $D_4$) supplied by the A/D converter were applied directly to the NRZ-M modulator, while $B_3$ represents the binary signals which would have been supplied by the NRZ-M modulator if the data words ($D'_1$ . . . $D'_4$) supplied by the inverter I were applied directly to said modulator.

The use of the inverter I firstly ensures that small sample values of the audio signal result in a binary signal with relatively many level transitions. This becomes evident when the binary signals $D_1(B_2)$ and $D'_1(B_3)$ are compared, which respectively represent the sample value zero without and with the use of the inverter, while a comparison of the binary signals $D_2(B_2)$ and $D'_2(B_3)$ demonstrates that also for a sample value $A=0.01$ $A_{max}$ the use of the inverter leads to a substantial increase of the number of level transitions.

Said number of level transitions per data word, or rather the maximum spacing between two consecutive level transitions, is essential for the clock generation which is required for decoding the binary signal. This clock generation can be effected in a reliable manner only if the binary signal contains a sufficient number of level transitions.

The use of the inverter ensures that said requirement is met for small sample values of the audio signal. This step is prompted by the fact that static measurements have demonstrated that in an audio signal small signal values are represented relatively strongly, so that owing to the use of the inverter a comparatively great part of the data words resulting from the audio signal meet the requirements with respect to the possibility of a reliable clock generation.

However, due to the use of the inverter specific relatively large sample values result in a binary signal with a large spacing between two consecutive level transitions. This may be illustrated by the binary signal $D'_3(B_3)$ corresponding to a sample value $A=0.25\ A_{max}$, where a spacing greater than 12 bit cells occurs between two consecutive level transitions. Although such sample values occur relatively seldom, they may impair the clock generation.

This is remedied by rearranging the data bits by the use of the device BS. As appears from the binary signal $D''_3(B_1)$ said rearrangement ensures that the spacing between two consecutive level transitions is reduced. Specifically, it ensures that for all sample values resulting in data words whose two most significant amplitude bits are "0", for sample values smaller than $A=0.25\ A_{max}$, the spacing between two consecutive level transitions is maximum 7 bit cells.

The risk that consecutive signal transitions are spaced by more than 7 bit cells then arises only for sample values for which one of said two most significant amplitude bits is "1" and, in addition, more than six amplitude bits situated on either side of said most significant amplitude bits are also "1", which corresponds to a very large and consequently very infrequent sample value.

Figure 3:
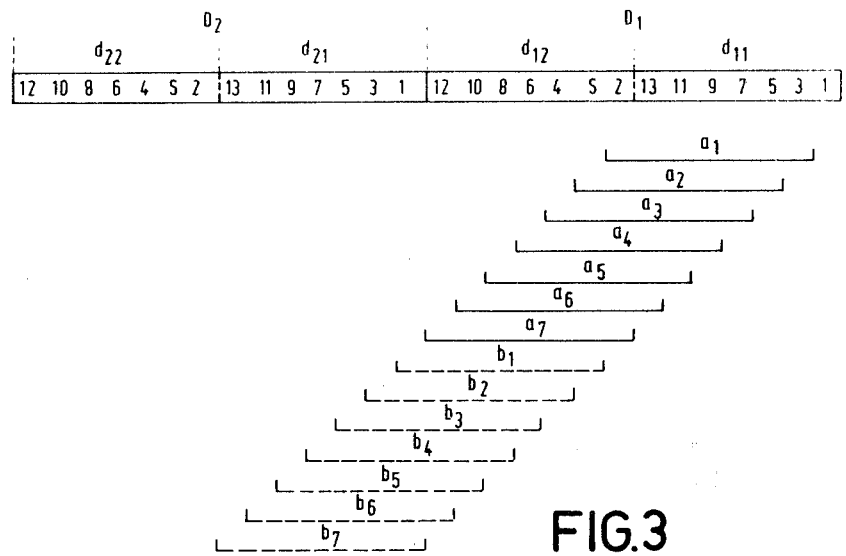
FIG. 3 represents two data words to illustrate a preferred embodiment of the method in accordance with the invention.

In order to ensure that even for such rarely occurring sample values a reliable clock generation is obtained the method in accordance with the invention may be modified in a manner as is schematically represented in FIG. 3. In the case of this modification it is continuously ascertained whether the stream of data bits on the output of the device BS contains seven consecutive data bits which are all "0". If this situation occurs within one of the time windows $a_1$ to $a_7$, the least significant amplitude bit situated within all these windows (bit with sequence number 2 of the data word $D_1$) is modified. In a similar way the least significant amplitude bit within the windows $b_1$ to $b_7$ (bit with sequence number 1 of the data word $D_2$) is modified if within one of said time windows $b_1$ to $b_7$ only bits with the binary value "0" appear. This step ensures that the spacing between consecutive level transitions in the signal obtained after NRZ-M modulation is maximum 7 bit cells. Obviously, the modification of the least significant amplitude bit introduces an error in the sample value. However, since this modification only occurs in the case of comparatively larger sample values, the error which attends this modification of one of the two least signification amplitude bits is very small relative to said sample value and is consequently not audible.

With respect to this modification a number of refinements are possible. For example, if, in accordance with the criterion used, the amplitude bit with the sequence number 2 is modified (0→1), which results in a decrease of the sample value, it may be ascertained whether it is possible to simultaneously modify the amplitude bit with the sequence number 1 in the relevant data word from "1" to "0". If this is possible, the error in the sample value as a result of the modification is halved.

The risk that within one data word both least significant amplitude bits have to be modified in accordance with the above criterion is minimal. This necessity exists only if all further data bits are "0", that is, a very high sample value occurs, or a value greater than (8188/8191) $A_{max}$ in the present example of 13 amplitude bits. By limiting the maximum drive of the audio signal relative to said amplitude, which is a negligible restriction, it is ensured that the necessity to modify the two least significant bits of a data word cannot occur as a result of said data word.

Figure 4:
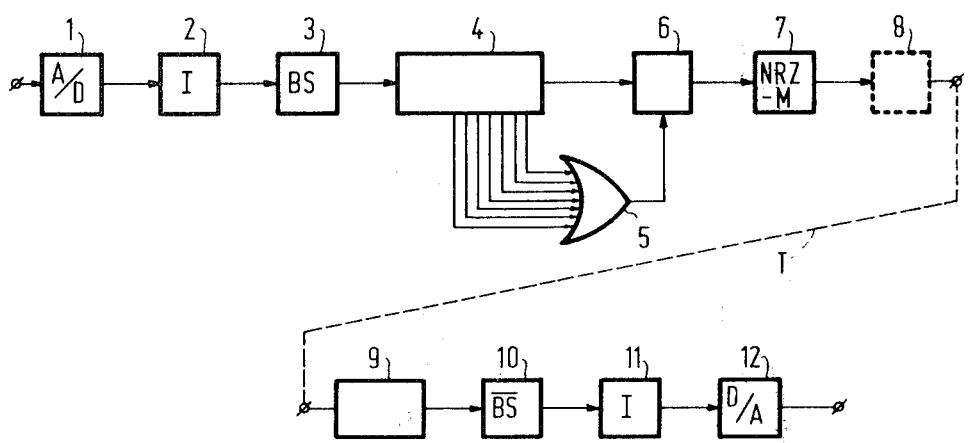
FIGS. 4 and 5 are block diagrams of the circuits employed in the method in accordance with the invention.

To illustrate this, FIG. 4 shows a block diagram of the coding and decoding device to be used in the method in accordance with the invention. The coating device first of all comprises an A/D converter 1 for converting the analog audio signal into digital data words, said data words comprising one sign bit and a plurality of amplitude bits. Further, the coding device comprises an inverter 2 for inverting the data bits. Said inverter may of course form part of the A/D converter. Furthermore, it is to be noted that the only function of the inverter 2 is to ensure that during NRZ-M modulation a data bit "0" results in a level transition and a data bit "1" causes no level transition. This means that the said inversion may also be effected in the NRZ-M modulator if, in contradistinction to common practice, it does not convert a data bit "1" but a data bit "0" into a level transition.

In the device 3 the arrangement of the data bits of each data word is modified in order to form the subwords. The number of subwords (N) may then be chosen freely in accordance with the number of data bits per data word. For example, the 14-bit data words mentioned in the foregoing may also be arranged in three subgroups of 5, 5 and 4 data bits respectively, each of the subgroups containing one of the 3 most significant amplitude bits. Generally, the amplitude bits will be distributed among the subgroups in such a way that a most uniform composition of said subgroups is obtained. Furthermore, the most significant amplitude bits will be positioned in such a way within said subgroups that the spacings between said most significant amplitude bits are most uniform. When arranging the 14 data bits in 3 subgroups, this would imply a spacing of 5, 5 and 4 bit cells respectively.

The binary data stream thus obtained is applied to a shift register 4. For data words of 14 data bits, which are again arranged in 2 subgroups, 7 tappings of said shift register are then connected to an OR-gate 5. The output signal of said OR-gate 5 is then always an indication whether within a time window of 7 bit cells no data bit of the logic value "1" occurs. Said output of the OR-gate 5 controls a modification unit 6, which is also coupled to the output of the shift register and, in the absence of a "1" within said time window, modifies the least significant bit situated within said window. Obviously, said modification unit should operate in synchronism with the applied data words and subwords.

The modified binary signal on the output of the modification unit 6 is subsequently applied to the NRZ-M modulator 7, which derives the desired binary transmission signal for the transmission channel (T in accordance with the broken line) from said signal.

The block 8 schematically represents the possibility of a further modification of the signal supplied by the NRZ-M modulator in order to optimize the transmission signal with respect to the properties of the transmission channel. As an example, in digital transmission it is customary to add a number of parity bits to each data word in order to permit error detection and correction during decoding. Furthermore, it is common practice to add special synchronisation words in order to obtain the word synchronisation necessary during decoding. Finally, it is of course possible to apply additional modifications and/or transformations of the binary signal, for example in order to reject the d.c. component in the binary signal, for which a large number of possibilities are known. Since said modifications are not essential for the present invention, they will not be described in more detail. The decoding device firstly comprises a demodulator 9, which is adapted to reconvert the applied binary signal from the transmission channel into binary data words. For this purpose said device, in addition to the specific demodulation circuit, comprises synchronising circuits for the purpose of word and bit synchronisation. Especially for this bit synchronisation (clock generation) the presence of a sufficient number of level transitions is of great importance. The data words supplied by said demodulator 9 are applied to a device 10, which rearranges the data bits of each data word in accordance with the usual pattern. The analog audio signal is then recovered by inversion (inverter 11) and D/A conversion (converter 12).

It will be evident that the coding and the decoding circuit largely employ existing units and logic circuitry. Only the devices 3 and 10 for modifying the arrangement of the data bits are of a less customary type. However, said device can simply be realized by applying the data bits of each data word in parallel to a switching device, which transfers the data bits to a single output in the desired sequence. A very simple construction is obtained by applying the data bits in parallel to a shift register, said data bits being read out serially from said register.

Figure 5:
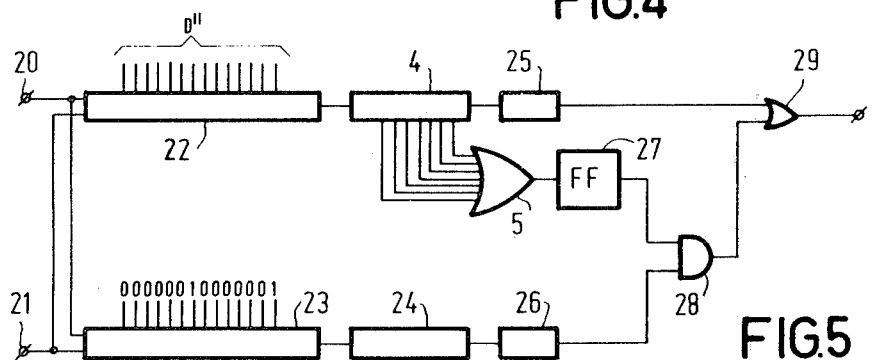

FIG. 5 finally shows a further elaborated version of a part of the encoding device. The device comprises a shift register 22 comprising 14 parallel inputs to which the data word D" are applied. Via a control signal applied to a control input 20 each data word D" is loaded into the shift register 20, after which under control of a bit-clock signal applied to the input 21 the data words are read out serially.

These data bits are then applied to the shift register 4, also shown in FIG. 4, the OR-gate 5 detecting whether a logic "1" is present within a time window of 7 data bits. The output of the OR-gate 5 is connected to a flip-flop 27, whose output becomes "1" if no "1" appears within a time window of 7 data bits. Said flip-flop is reset upon each series of time windows, that is, after $a_7$ and $b_7$ respectively (FIG. 3), for which purpose a suitable control signal (not shown) may be derived from the input 20.

A shift register 23 receives a fixed data pattern on its 14 parallel inputs, only those inputs which correspond to the two most significant bits receiving a logic "1". The output of said shift register 23 is connected to an AND-gate 28 via a shift register 24 which introduces the same delay as the shift register 4. Said AND-gate 28 is also connected to the flip-flop 27, so that the output of said AND-gate 28 becomes "1" upon the appearance of one of the two least significant data bits, provided that the output of the flip-flop 27 is then "1". The output of the AND-gate 28 is connected to an input of the OR-gate 29, of which a second input is connected to the output of the shift register 4, so that the logic "0" of one of the most significant data bits is modified into a logic "1". Between these respective shift registers 4 and 24 and the respective gates 29 and 28 additional delay elements 25 and 26 may be arranged in order to provide the correct time synchronisation between the various channels.

What is claimed is:

1. A method of converting an analog audio signal into a binary signal and vice versa, specifically intended for use in a transmission system for recording and reproducing said audio signal on a record carrier, the analog audio signal being converted into a binary signal by means of an analog-to-digital conversion, for converting samples of the analog audio signal into digital data words of M data bits each, and a modulation, for converting said data words into a binary signal, which modulation is such that in said binary signal data bits of a first type are represented by the presence of a level transition and data bits of a second type by the absence of such a level transition, and the binary signal being reconverted into the analog audio signal by means of a demodulation, by which the binary signal is demodulated and converted into digital data words of M data bits each, and a digital-to-analog conversion, by which said data words are converted into analog sample values of the audio signal, characterized in that the analog-to-digital conversion is adapted to supply data words comprising $M-1$ amplitude bits, which together in binary coded form represent the sample magnitude, and one sign bit, which represents the polarity of the sample, said digital-to-analog conversion being such that a sample having zero value results in $M-1$ amplitude bits of the first type and that prior to the modulation each data word is divided into N subwords, the data bits of the data word being arranged in such a way in the subwords that each subword contains one of the N most significant amplitude bits of the data words, while during reconversion of the binary signal into the analog audio signal, upon modulation of the binary signal, the data bits of the N subwords are again rearranged to form data words of M data bits and the digital-to-analog conversion is adapted to convert said data words comprising $M-1$ amplitude bits and one sign bit into an analog sample value.

2. A method of converting an analog audio signal into a binary signal and vice versa, specifically intended for use in a transmission system for recording and reproducing said audio signal on a record carrier, the analog audio signal being converted into a binary signal by means of an analog-to-digital conversion, for converting samples of the analog audio signal into digital data words of M data bits each, and a modulation, for converting said data words into a binary signal, which modulation is such that in said binary signal data bits of a first type are represented by the presence of a level transition and data bits of a second type by the absence of such a level transition, and the binary signal being reconverted into the analog audio signal by means of a demodulation, by which the binary signal is demodulated into digital words of M data bits each, and a digital-to-analog conversion, by which said data words are converted into analog sample values of the audio signal, characterized in that the analog-to-digital conversion is adapted to supply data words comprising $M-1$ amplitude bits, which together in binary coded form represent the sample magnitude, and one sign bit, which represents the polarity of the sample, said digital-to-analog conversion being such that a sample having zero value results in M−1 amplitude bits of the first type and that prior to the modulation each data word is divided into N subwords, the data bits of the data word being arranged in such a way in the subwords that each subword contains one of the N most significant amplitude bits of the data words, while during reconversion of the binary signal into the analog audio signal, upon modulation of the binary signal, the data bits of the N subwords are again rearranged to form data words of M data bits and the digital-to-analog conversion is adapted to convert said data words comprising M−1 amplitude bits and one sign bit into an analog sample value, said M and N are selected so that M/N is an integer and the N most significant amplitude bits are arranged in such a way in the N subwords that their spacing is always equal to M/N bit cells.

3. A method as claimed in claim 1 or 2, characterized in that the amplitude bits are arranged in such a way in the subwords that each subword comprises one of the N least significant amplitude bits.

4. A method as claimed in claim 2, characterized in that the N least significant amplitude bits are arranged in such a way within the subwords that their spacing is always M/N bit cells.

5. A method as claimed in claim 4, characterized in that if no data bit of the first type occurs within a time window corresponding to M/N bit cells and comprising one of the N least significant amplitude bits, the relevant least significant amplitude bit is inverted.

6. A coding device for use with the method as claimed in claim 1 or 2, comprising an analog-to-digital converter for converting samples of the analog audio signal into data words of M data bits and an NRZ-M modulator for converting data words into a binary signal, characterized in that the coding device further comprises an arranging device preceding the NRZ-M modulator for arranging the M data bits of a data word in N subwords, each subword comprising one of the most significant amplitude bits of the data word, and that the analog-to-digital converter in conjunction with the NRZ-M modulation is adapted so that a zero sample value exclusively results in signal transitions corresponding to the amplitude bits in the binary signal.

7. A coding device as claimed in claim 6, characterized in that the arranging device is adapted so that each of the subgroups comprises one of the N least significant amplitude bits which are equidistantly spaced and the coding device further comprises a detector, for the detection of the data bits within a time window corresponding to M/N data bits and supplying a detection signal if no data bits of the first type occur within said time window, and a modification device, for modifying the logic value of the least significant amplitude bit within the relevant time window in response to said detection signal.

8. A decoding device for use with the method as claimed in claim 1, comprising an NRZ-M demodulator for converting the binary signal into digital data words and a digital-to-analog converter for converting digital data words into analog samples of the audio signal, characterized in that the decoding device is provided with a rearranging device, for rearranging the data bits of N subgroups to one data word, and that the digital-to-analog converter is adapted to process data words with M−1 amplitude bits and one sign bit.

* * * * *